(12) United States Patent
Bruder

(10) Patent No.: US 6,223,917 B1
(45) Date of Patent: May 1, 2001

(54) PROFILE ARRANGEMENT FOR BUILDING EXHIBITION OR SHOP SYSTEMS

(75) Inventor: Hans Bruder, Aichtal-Aich (DE)

(73) Assignee: Octanorm-Vertriebs-GmbH fuer Bauelemente, Filderstadt (DE)

( * ) Notice: Subject to any disclaimer, the term of this patent is extended or adjusted under 35 U.S.C. 154(b) by 0 days.

(21) Appl. No.: 09/417,123

(22) Filed: Oct. 13, 1999

(30) Foreign Application Priority Data

Oct. 16, 1998 (DE) .............................................. 298 18 474

(51) Int. Cl.$^7$ ...................................................... A47F 5/00
(52) U.S. Cl. .................. 211/189; 403/231; 403/264; 312/140; 312/257.1; 211/182
(58) Field of Search ..................... 211/182, 189, 211/190, 191, 186, 187; 312/140, 257.1, 265.1, 265.2, 265.3, 265.4, 265.5; 403/231, 264

(56) References Cited

U.S. PATENT DOCUMENTS

| | | | |
|---|---|---|---|
| 3,216,170 | * | 11/1965 | Deadrick . |
| 3,393,031 | * | 7/1968 | Morrill . |
| 3,765,541 | * | 10/1973 | Madey et al. ........................ 211/182 |
| 3,892,189 | * | 7/1975 | Killam .............. 211/182 X |
| 3,919,603 | * | 11/1975 | Salvati et al. ..................... 211/182 X |
| 4,045,104 | * | 8/1977 | Peterson ........................... 211/182 X |
| 4,064,995 | * | 12/1977 | Bustos .................................. 211/187 |
| 4,368,936 | * | 1/1983 | Worrallo .......................... 312/140 X |
| 4,768,845 | | 9/1988 | Yeh ................................... 312/257 SK |
| 4,869,380 | * | 9/1989 | Metcalfe et al. ...................... 211/189 |
| 4,960,255 | * | 10/1990 | Obenshain . |
| 5,997,117 | * | 12/1999 | Krietzman .......................... 312/265.4 |

FOREIGN PATENT DOCUMENTS

| | | |
|---|---|---|
| 9312847 U | 2/1994 | (DE) . |
| 29717513 U1 | 1/1998 | (DE) . |
| 0 843 103 | 5/1998 | (EP) . |
| 1 363 195 | 9/1964 | (FR) . |
| 2 039 207 | 1/1971 | (FR) . |
| 2 461 140 | 1/1981 | (FR) . |

* cited by examiner

*Primary Examiner*—Robert W. Gibson, Jr.
(74) *Attorney, Agent, or Firm*—Evenson, McKeown, Edwards & Lenahan, P.L.L.C.

(57) ABSTRACT

A profile arrangement for building exhibition or shop systems is described which has the purpose of expanding the multiple usage possibilities of such profiles and improving the aesthetic effects particularly by additional different colorations. For this purpose, it is provided that, in the case of a polygonal profile, which by way of corner pieces with projecting pins can be assembled with others, on at least two lateral surfaces abutting to form an edge, one recess respectively is provided which continues along the profile length and which is used for sliding in a strip consisting of a material other than that of the profile. This strip may have a colored design and thus, while one and the same profile is used, permits the achieving of different aesthetic effects.

29 Claims, 3 Drawing Sheets

PROFILE ARRANGEMENT FOR BUILDING EXHIBITION OR SHOP SYSTEMS

BACKGROUND AND SUMMARY OF THE INVENTION

This application claims the priority of German application 298 18 474.5, filed Oct. 16, 1998 in Germany, the disclosure of which is expressly incorporated by reference herein.

The invention relates to a profile arrangement for building exhibition or shop systems, having a polygonal profile which is provided with at least one hollow chamber open on the face side, and which can be connected with additional profiles by means of corner pieces which engage in the hollow chambers by means of projecting pins.

Profiles of this type are known (Newline System of Octanorm-Vertriebs-GmbH fur Bauelemente, Filderstadt). These light-metal profiles are offered in different surface qualities which range from anodized aluminum to color-coated profiles. This provides a multiplicity of combination possibilities.

It is an object of the present invention to further expand the multiplicity of such profiles and provide a possibility for designing shop and exhibition systems also such that they have the appearance of systems manufactured with wood or improve aesthetics by additional different colorations.

For achieving this object, it is provided in the case of a profile of the initially mentioned type that a recess, which continues along the profile length and is used for sliding in a strip consisting of a different material than that of the profile, is provided on at least two lateral surfaces abutting to form an edge. As the result of this further development, it is possible, for example, to slide strips consisting of wood or strip consisting of plastic, which have a wood effect, into the recesses of the light-metal profiles in order to achieve special aesthetic effects and give the shop or exhibition systems the appearance of valuable wood systems.

In a first embodiment, it can now be provided that each lateral surface has a recess in the form of a wide and flat groove, parts of the lateral surfaces of the profile parts reaching over the edges of the groove, and that a flat strip, preferably one with a rectangular cross-section, is slid into this groove. As a further development of the invention, this groove may form a type of dovetail groove for the correspondingly bevelled edges of the strips.

In this embodiment, the corner piece, which is used for connecting the profiles, is provided on at least three sides aligned with the lateral surfaces of the profiles with recesses corresponding to the groove. In a preferred embodiment, the corner piece may be constructed as a cube with pins projecting from two lateral surfaces. From these lateral surfaces, recesses extend in each case into three adjoining lateral surfaces, which recesses correspond in their cross-section to that of the groove of the profiles and, in each case, end at a transverse edge bounding the lateral surfaces with respect to one another.

As the result of this further development, visually metallic strip elements remain at the edges of the profiles assembled to form shop or exhibition systems, which elements are offset from the used strips, thus, for example, from wood, in the central area of the profiles. This results in an aesthetically very attractive effect.

However, in another embodiment, it may also be provided that the recess is part of an indentation reaching over both lateral surfaces, over which indentation a section of the lateral surface reaches in each case on both edges, and in that a strip can be inserted into this indentation which is an edge profile with an edge formed between two outer surfaces aligned at a right angle with respect to one another and aligned with the lateral surfaces of the profile. In this embodiment, the edges are therefore not formed from the material of the profile but from that of the inserted strip, thus, for example, by a wooden strip, which, however, in the extension of its lateral surfaces, merges into the metallic surfaces of the profile which act as strips.

In this embodiment, the corner piece may be constructed as a cube which is provided on all sides not equipped with pins with recesses corresponding to the cross-section of the strip, a shaped piece, which is made of the same material as the edge profiles and forms a corner, being inserted in a fitting manner into these recesses. The corner of a system object in this embodiment is therefore formed by a piece of wood which merges toward the outside into metallic surfaces. The aesthetic effect of such a further development differs from that of the first embodiment.

Other objects, advantages and novel features of the present invention will become apparent from the following detailed description of the invention when considered in conjunction with the accompanying drawings.

DETAILED DESCRIPTION OF THE DRAWINGS

Figure 1:
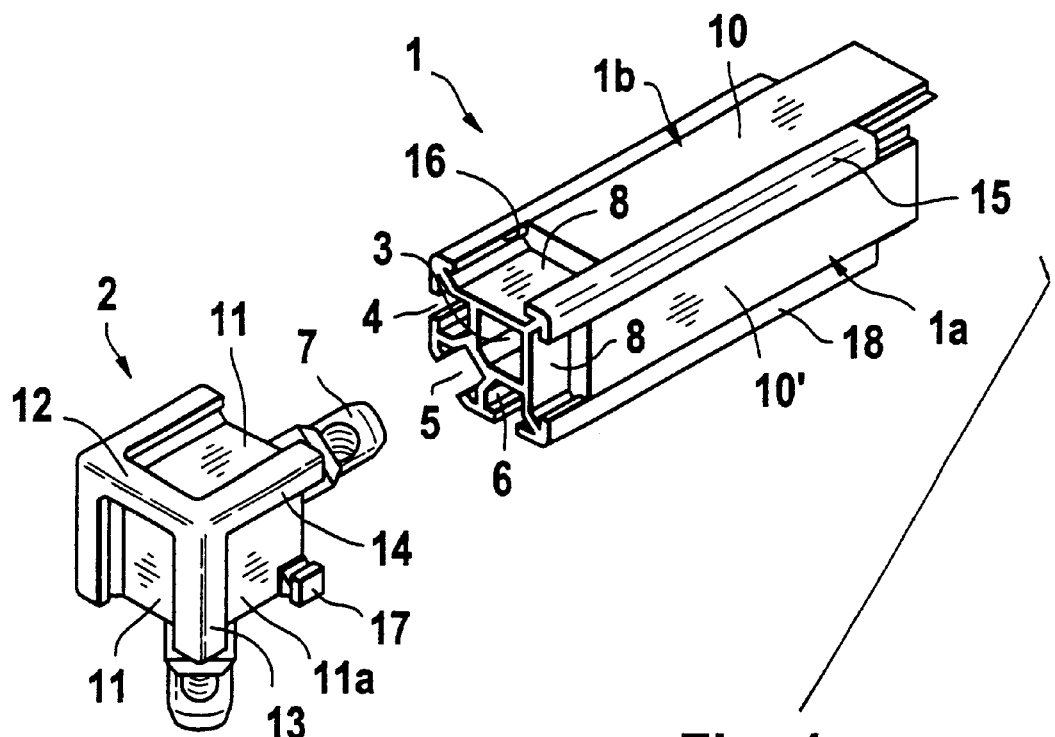
FIG. 1 is an exploded view of two profiles according to the invention which can be assembled by way of a corner piece.
Figure 1:
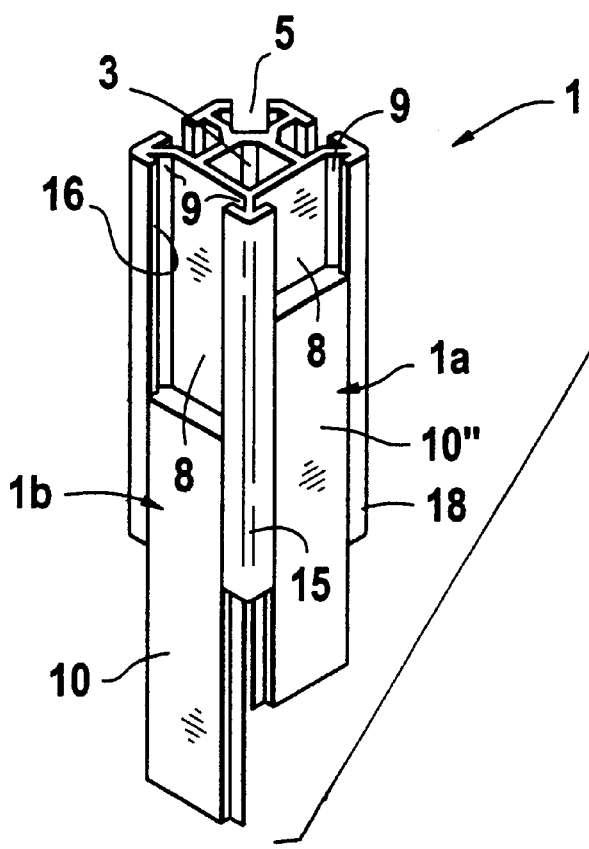
Figure 2:
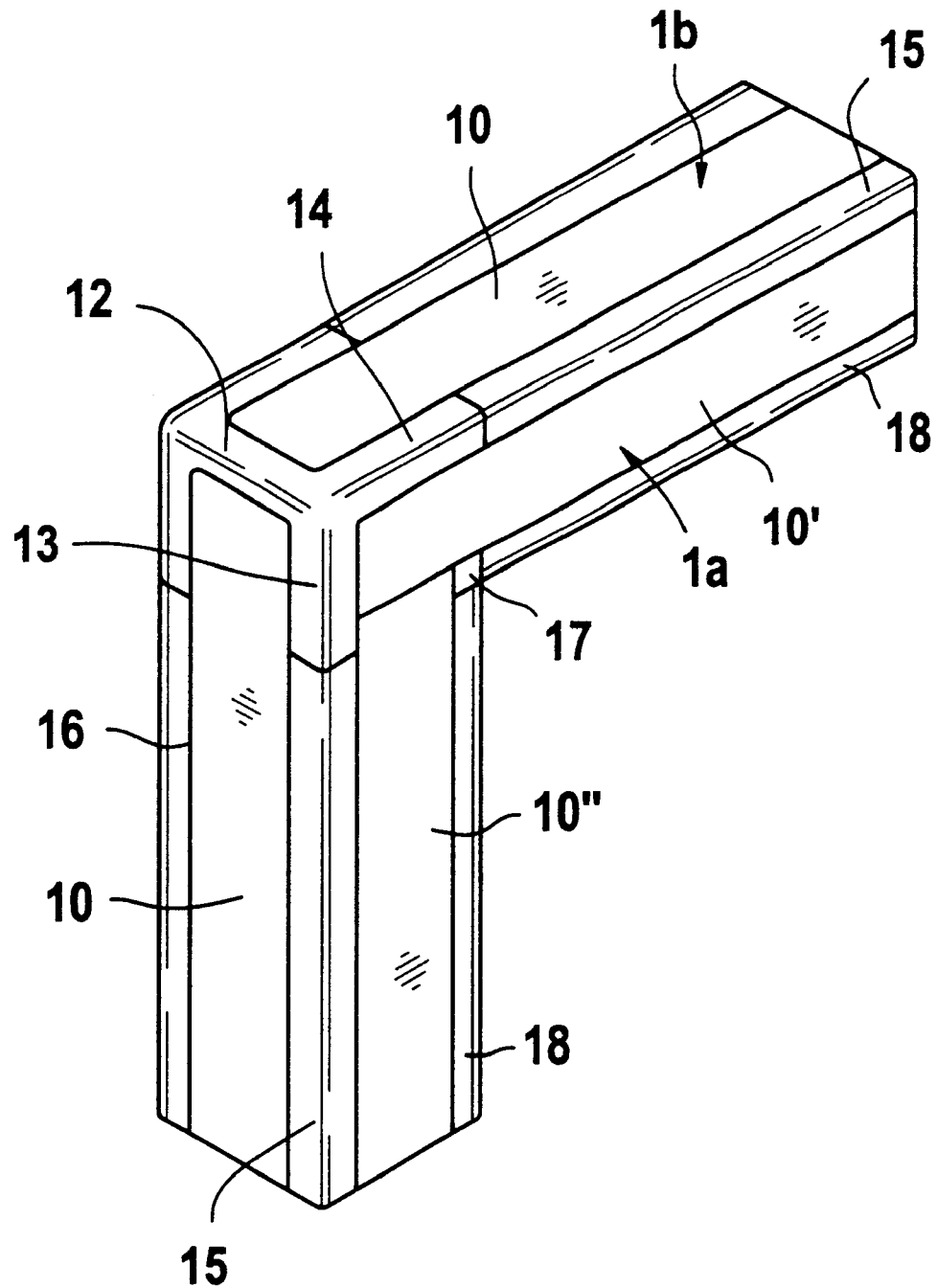
FIG. 2 is a view of the corner formed after the profiles of FIG. 1 are assembled.

FIG. 1 shows two drawn metal profiles 1, for example, made of aluminum, which can be connected with one another by means of a corner piece 2 to form the angular structure illustrated in FIG. 2. The profiles 1 are used, for example, for producing showcases or display cases for shop systems or the like.

Each of the profiles 1 has a central hollow chamber 3 as well as three hollow chambers 4, 5 and 6 which are open toward the outside and of which the hollow chamber 5 and the hollow chamber 3 are used for receiving a two-part pin 7 which is fastened to the corner piece 2. The hollow chambers 4, 5 and 6 are each open toward the outside. Panelling plates or other constructional elements can be pushed into and held particularly in the open slots of the hollow chambers 4 and 5.

Each of the profiles 1 has two lateral surfaces 1a and 1b situated at 90° with respect to one another, into which one groove 8 respectively is machined which continues almost along the whole width of the lateral surface and which has a type of dove tail profile with undercut edges 9, the remaining portions of the lateral walls 1a and 1b reaching over the edges 9. Flat strips 10 consisting of another material are in each case slid as the profiles 1 into these flat dovetail grooves 8, these strips 10 having bevelled edges for an insertion into the edges 9 of the groove. The strips 10 may, for example, be made of wood and therefore provide the profile with a particularly aesthetic appearance which is shaped by the remaining metal edges of the lateral surfaces 1a and 1b with the wood structure situated in-between.

The corner piece 2 is cube-shaped and, on the sides in each case facing the lateral surfaces 1a and 1b of the profiles 1, has recesses 11 whose cross-section corresponds to the cross-sectional shape of the grooves 8. These recesses 11 and 11a extend as far into the assigned cube surfaces as the width of the strips 10. In the assembled condition according to FIG. 2, the two exterior strips 10 extend to the outer edge 12 formed in the corner piece 2; the strip 10' extends to the lateral edge 13 of the corner piece 2; and the strip 10'' extends to the stop on the strip 10'. It is also contemplated according to certain preferred embodiments to slide the strip 10'' to the stop on the edge 14, and to let the strip 10' stop at the strip 10''. In every case, the lateral edges 13, 14 of the corner piece 2 and the edges 15 of the lateral surfaces 1a and 1b aligned therewith form a metallically continuous edge which is supplemented by the interior edges 16, so that the wood strips 10, 10', 10'' inserted in-between, together with the profiles, result in a special effect which is very aesthetic and attractive particularly for building shop systems. It is illustrated that, for achieving this effect, the corner piece 2 has a parallelepiped-shaped corner projection 17 at the forward edge of the recess 11a, which corner projection 17 establishes the connection to the remaining interior edges 18 of the profiles 1 in the assembled condition.

The strips 10, 10' and 10''' may also consist of a material other than wood according to other contemplated embodiments of the invention. Colored plastic strips in conjunction with the aluminum profile 1 and the corner connector 2 can also cause special aesthetic effects.

Figure 3:
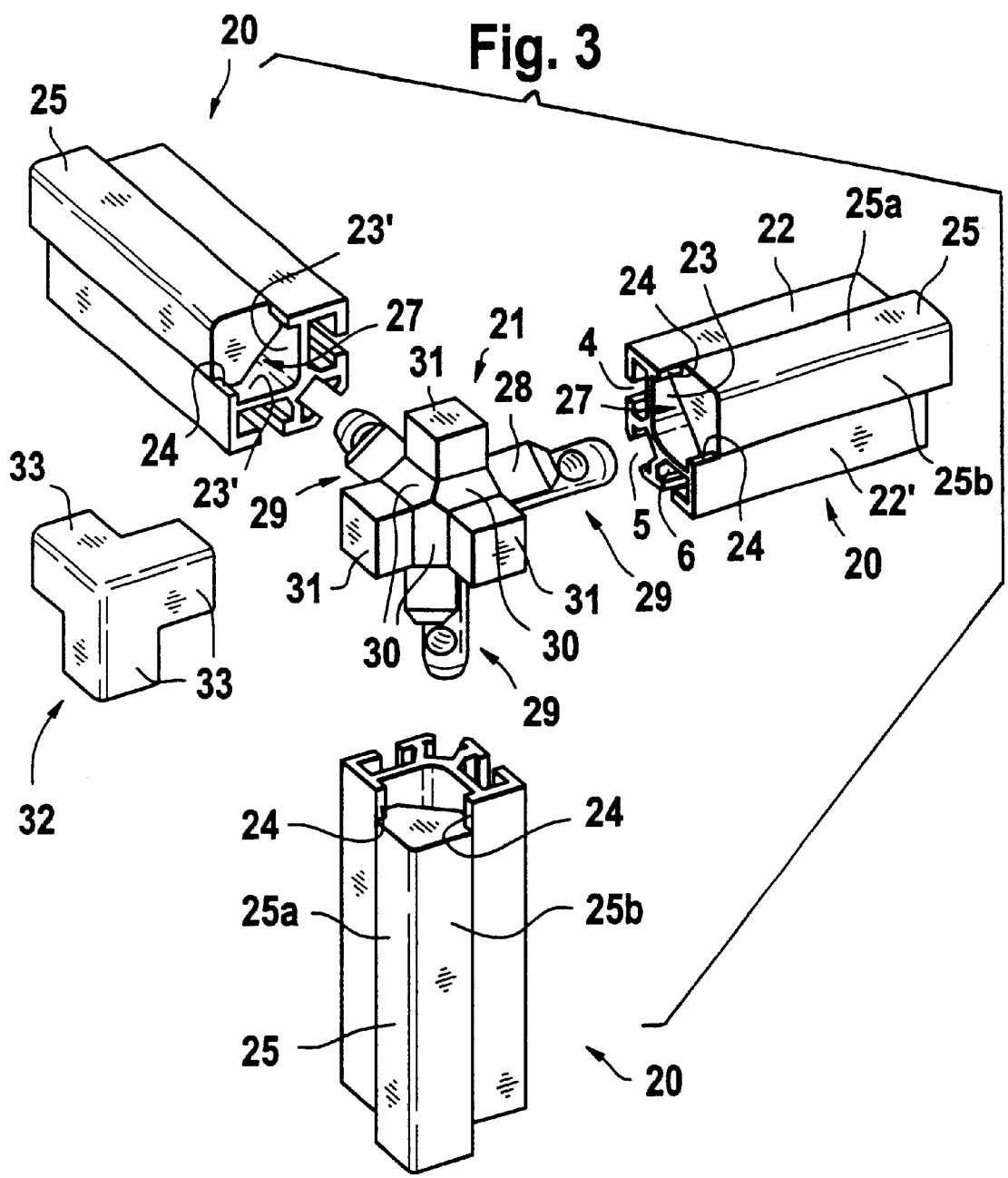
FIG. 3 is an exploded view of another embodiment of a profile arrangement according to the invention whose profiles can be assembled by means of another corner piece.

FIG. 3 illustrates another embodiment of profiles according to the invention. In FIG. 3, three light-metal profiles, particularly drawn aluminum profiles 20, are provided which, like the profiles 1 of FIG. 1, have two lateral surfaces 22, 22', which are situated at 90° with respect to one another, and the hollow chambers 4, 5 and 6, like the profiles 1. The lateral surfaces 22 and 22' are separated from one another by an indentation 23 with two bottom surfaces 23' situated at 90° with respect to one another, and an edge 24 of the lateral surfaces 22 and 22' in each case reaches over these lateral bottom surfaces 23' such that one edge strip 25 respectively, which consists of a material other than that used for manufacturing the profiles 20, can be slid into the indentation 23 in the fitting manner. At the edge, the edge strip 25 has corresponding recesses, into which the edges 24 engage so that the outer surfaces 25a and 25b of the edge strips 25 arranged at a right angle with respect to one another are aligned with the remaining portions of the lateral walls 22 and 22' of the profile 20.

On its interior side, the edge strip 25 has a bevelling 27 which leaves a hollow space with an approximately triangular cross-section within the recess 23 in order to be able to accommodate a portion 28 of the two-part connection pin 29 and securely establish the connection of the corner piece 21 with the profiles 20.

FIG. 3 also shows that the corner piece 21 on the three sides of the construction, which is cube-shaped in principle, which are not provided with the connection pins 29, are provided with recesses 30 which, in their cross-section, in each case, correspond to the edge strips 25. Of the original cubical shape of the corner piece 21, only three parallelepiped exterior wall pieces 31 therefore remain whose surfaces are aligned with the exterior surfaces of a shaped piece 32 which is fittingly placed onto the corner piece 21, in order to be fittingly inserted by means of its three arm stubs 33, which each project at an angle of 90° with respect to one another, into the recesses 30 and be held there by gluing or the like, or are constructed to be so long that the ends of these arm stubs 33 each penetrate a small distance into the recesses 23 of the profiles 20, so that the shaped piece 32 is held in its end position on the corner piece 21 after the connection of the profiles 30 to this corner piece.

In this embodiment, the corner of the thus formed construction is formed by the shaped piece 32, which may consist of the same material as the edge strips 25; that is, also of wood. This wooden corner then continues in three directions by means of the edge strips 25 which are each bounded on both sides by the edges of the lateral surfaces 22 and 22' of the profiles 20. This further development also results in an aesthetically attractive effect which can be used for building shop systems or other parts. Also in this case, the edge strips 25 must not necessarily consist of wood, although, as mentioned above, this may permit the achieving of particularly aesthetic effects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A support system comprising:
  a plurality of polygonal profile members which include a plurality of longitudinally extending lateral side surfaces, said profile members being provided with a hollow chamber opening on at least one end face thereof, and
  corner pieces including respective projecting pins and operable to join at least two of said profile members with a respective corner piece with respective projecting pins inserted in respective hollow chambers of the polygonal profile members,
  wherein said profile members include open ended profile member grooves extending along at least two adjacent ones of said lateral side surfaces, said profile member grooves each being configured to accommodate sliding in of a strip member, and
  wherein said corner pieces include corner grooves which are closed at ends thereof facing away from respective ones of the projecting pins and opening toward respective ones of the profile member grooves when connected with respective profile members to thereby form a continuation of the respective profile member grooves.

2. A support system according to claim 1, wherein said profile member grooves are formed as wide grooves with portions of adjacent lateral side surfaces extending over edges of the respective grooves,
  comprising strip members to be slid into respective ones of said grooves.

3. A support system according to claim 2, wherein the profile member grooves are dovetail grooves for accommodating corresponding beveled edges of said strip members.

4. A support system according to claim 2, wherein the corner pieces each include three of said corner grooves, and
  wherein the strip members are adapted to be slid into respective aligned profile member grooves and corner grooves.

5. A support system according to claim 4, wherein the corner pieces are cubes which each have at least two of said projecting pins insertable into respective hollow chambers of mutually perpendicular profile members.

6. A support system according to claim 1, wherein a plurality of flat strip members are provided which are slidably disposable in respective adjacent aligned profile member grooves and corner grooves.

7. A support system according to claim 5, wherein a plurality of flat strip members are provided which are slidably disposable in respective adjacent aligned profile member grooves and corner grooves.

8. A support system according to claim 7, wherein respective ones of the strip members are adapted to extend into respective adjacent corner grooves.

9. A support system according to claims 1, wherein each corner piece is a cube with six exterior facing cube sides, at least two of said cube sides having respective projecting pins extending outwardly thereof, and wherein cube sides which have no projecting pins are provided with said corner grooves.

10. A support system according to claim 9, wherein three mutually perpendicular cube sides have respective projecting pins extending outwardly thereof.

11. A support system according to claim 10, wherein a plurality of flat strip members are provided which are slidably disposable in respective adjacent aligned profile member grooves and corner grooves.

12. A support system according to claim 10, wherein only two of said cube sides, which are perpendicular to one another, are provided with respective projecting pins extending outwardly thereof.

13. A support system according to claim 12, wherein a plurality of flat strip members are provided which are slidably disposable in respective adjacent aligned profile member grooves and corner grooves.

14. A support system according to claim 1, comprising a plurality of flat strip members adapted to be slid into said grooves.

15. A support system according to claim 14, wherein said flat strip members are made of a material different than the material of said profile members and corner pieces.

16. A support system according to claim 1, wherein said flat strip members are of a rectangular shape.

17. A support system according to claim 15, wherein said flat strip members are of a rectangular shape.

18. A support system according to claim 17, wherein the profile member grooves are dovetail grooves for accommodating corresponding beveled edges of said strip member.

19. A support system according to claim 1, wherein said profile members have respective hollow chamber openings on opposite end faces thereof.

20. A support system comprising:

a plurality of polygonal profile members which include a plurality of longitudinally extending lateral side surfaces, and corner pieces operable to join at least two of said profile members with a respective corner piece with respective projecting pins at one of said corner pieces and said profile members inserted in respective hollow chambers of the other one of said corner pieces and said profile members, wherein said profile members include open ended profile member grooves extending along at least two adjacent ones of said lateral side surfaces, said profile member grooves each being configured to accommodate sliding in of a strip member, and wherein said corner pieces include corner grooves which are closed at ends thereof facing away from ends joining an adjacent profile member when assembled and opening toward respective ones of the profile member grooves when assembeld with respective profile members to thereby form a continuation of the respective profile member grooves.

21. A support system according to claim 20, wherein said profile member grooves are formed as wide grooves with portions of adjacent lateral side surfaces extending over edges of the respective grooves, comprising strip members to be slid into respective grooves.

22. A support system according to claim 21, wherein the profile member grooves are dovetail grooves for accommodating corresponding beveled edges of said strip member.

23. A support system according to claim 20, wherein the corner pieces each include three of said corner grooves, and wherein the strip members are adapted to be slid into respective aligned profile member grooves and corner grooves.

24. A support system according to claim 20, wherein a plurality of flat strip members are provided which are slidably disposable in respective adjacent aligned profile member grooves and corner grooves.

25. A support system according to claim 24, wherein respective ones of the strip members are adapted to extend into respective adjacent corner grooves.

26. A support system according to claim 20, wherein each corner piece is a cube with six exterior facing cube sides, at least two of said cube sides being configured to accommodate engagement of a respective projecting pin and hollow chamber to connect the corner piece with a profile member, other of said cube sides being provided with said corner grooves.

27. A support system according to claim 26, wherein a plurality of flat strip members are provided which are slidably disposable in respective adjacent aligned profile member grooves and corner grooves.

28. A support system according to claim 28, wherein said flat strip members are made of a material different than the material of said profile members and corner pieces.

29. A support system according to claim 28, wherein said flat strip members are of a rectangular shape.

\* \* \* \* \*